United States Patent [19]
Nakahashi

[11] 4,354,734
[45] Oct. 19, 1982

[54] OBJECTIVE OPTICAL SYSTEM FOR ENDOSCOPES

[75] Inventor: Ken-ichi Nakahashi, Hachiouji, Japan

[73] Assignee: Olympus Optical Co., Ltd., Tokyo, Japan

[21] Appl. No.: 174,697

[22] Filed: Aug. 1, 1980

[30] Foreign Application Priority Data

Aug. 7, 1979 [JP] Japan ................................. 54-100626

[51] Int. Cl.³ .......................... A61B 1/00; G02B 13/22
[52] U.S. Cl. .................................. 350/96.26; 350/415; 350/416; 350/480
[58] Field of Search ............. 350/415, 416, 480, 96.26

[56] References Cited
U.S. PATENT DOCUMENTS
4,102,559 7/1978 Hunzinger ........................... 350/480

FOREIGN PATENT DOCUMENTS
382042 8/1973 U.S.S.R. ............................... 350/480

OTHER PUBLICATIONS
Suzuki, Photographic Lens Handbook, 2/78.

Primary Examiner—John K. Corbin
Assistant Examiner—Rebecca D. Gass
Attorney, Agent, or Firm—Cushman, Darby & Cushman

[57] ABSTRACT

An objective optical system for endoscopes comprising an objective and image guide for transmitting an image of an object formed by the objective, the objective comprising a first lens component consisting of a cover glass and plano-covex lens, which are cemented together by arranging a stop between them, and a second lens component which is a plano-convex lens arranged toward the object side, the objective optical system for endoscopes enabling to observe with a wide field angle.

8 Claims, 8 Drawing Figures

OBJECTIVE OPTICAL SYSTEM FOR ENDOSCOPES

BACKGROUND OF THE INVENTION (a) Field of the Invention

The present invention relates to an objective optical system for endoscopes and, more particularly, to an objective optical system for endoscopes with small diameters such as bronchoscopes.

(b) Description of the Prior Art

Known objectives for bronchoscopes and the like employ a hemispherical lens or a plano-convex lens having a shape approximately hemispherical as shown in FIG. 1. This is because such lenses can be manufactured easily and even the lenses of such degree have sufficient performance for practical use as objectives for endoscopes. However, such objective consisting of such single lens has disadvantages as described below. In case of an objective shown in FIG. 1, the stop S is located between the cover glass $L_1$ and hemispherical lens $L_2$, i.e., at a position near the center of curvature of hemispherical lens $L_2$, in order to prevent astigmatism from occurring. Therefore, the principal rays are scarcely refracted by the spherical surface $r_3$ of the hemispherical lens $L_2$ and are refracted only by the plane surface $r_1$ of the cover glass $L_1$. Accordingly, as the field angle becomes large, the angle of incidence of ray which enters the image guide G comprising optical fibers becomes large. Optical fibers have such characteristic that their transmission factor becomes small as the angle of incidence of rays which enter them becomes large. This characteristic differs with such factors as the diameter of optical fiber and so forth. Generally, the transmission factor when the angle of incidence is 10° is about 50% of the case that the angle of incidence is 0°. When, therefore, the field angle is made large by making the size of the image surface large, the image in the marginal portion deteriorates. As a method for preventing the above-mentioned disadvantage, the refractive index of the lens may be made large in order to attain large refraction at the first surface of the objective. Another method is to locate the stop at a position as near as possible to the front focal point by tolerating astigmatism to such degree that it is not inconvenient for practical use. However, even when such methods are adopted, the field angle with which an image with favourable quality can be obtained is about 40° to 50° at the maximum.

SUMMARY OF THE INVENTION

It is, therefore, a primary object of the present invention to provide an objective optical system for endoscopes having simple lens configuration and, at the same time, enabling to observe with a wide field angle.

The objective according to the present invention has lens configuration as shown in FIG. 2 and comprises a first and second lens components. The first lens component comprises a cover glass $L_1$ and a plano-convex lens $L_2$ which are cemented together by arranging a stop S between them. The second lens component is a plano-convex lens $L_3$ arranged convex toward the object side and having its planar surface cemented to the end face on the entrance side of image guide G which comprises optical fibers.

In the objective according to the present invention arranged as above, the plano-convex lens $L_2$ constituting the first lens component has a shape similar to a hemisphere and is made of a material having a high refractive index. The conditions (1) and (2) shown below define the shape of refractive index of the plano-convex lens $L_2$.

$$0.7\ |r_3| \leq d_2 \leq 1.1\ |r_3| \tag{1}$$

$$n_2 \geq 1.75 \tag{2}$$

wherein the reference symbol $r_3$ represents the radius of curvature of the surface on the image side of the lens $L_2$, reference symbol $d_2$ represents the thickness of the lens $L_2$, and reference symbol $n_2$ represents the refractive index of the lens $L_2$.

That is, the condition (1) shows that the lens $L_2$ has a shape similar to a hemisphere. If, in this condition, the thickness $d_2$ of the lens $L_2$ becomes larger than the upper limit, astigmatism to be caused by the lens $L_2$ will be overcorrected. If $d_2$ becomes smaller than the lower limit, said astigmatism will be undercorrected.

The condition (2) is established in order to use a material with a high refractive index for the lens $L_2$ and to thereby prevent Petzval's sum from becoming large as Petzval's sum will otherwise become large because the objective is composed of convex lenses only. Besides, when the condition (2) is satisfied, it is possible to make the radius of curvature of the lens $L_2$ large and, consequently, it becomes easier to manufacture the lens $L_2$. When, therefore, the refractive index $n_2$ of the lens $L_2$ becomes smaller than the lower limit of the condition (2), Petzval's sum becomes large and it becomes inconvenient for the manufacture of the lens $L_2$.

The plano-convex lens $L_3$ is a field lens provided in order to reduce the angle of incidence of principal ray onto the image guide when the principal ray from the lens $L_2$ enters the image guide. When the focal point of the lens $L_3$ exists at a position near the stop, the principal ray which passes the stop enters the image guide with a small angle of incidence. This purpose can be attained when the focal length of the lens $L_3$ is made approximately equal to $d_2+d_3$ (wherein the reference symbol $d_2$ represents the thickness of the lens $L_2$ and reference symbol $d_3$ represents the airspace between the lens $L_2$ and lens $L_3$). In practice, the position of the stop will be changed somewhat forward or backward within the range of the condition (1) in order to correct aberrations to be caused by the lens $L_3$. Anyway, the function of the field lens is satisfactory when the angle of incidence onto the image guide is made smaller than about 10°. The condition (3) shown below is established by taking these points into consideration.

$$0.6 \times (n_3-1)(d_2+d_3) \leq r_4 \leq 1.4 \times (n_3-1)(d_2+d_3)$$

wherein the reference symbol $r_4$ represents the radius of curvature of the surface on the object side of the lens $L_3$, reference symbol $d_2$ represents the thickness of the lens $L_2$, the reference symbol $d_3$ represents the airspace between the lens $L_2$ and lens $L_3$, and reference symbol $n_3$ represents the refractive index of the lens $L_3$.

When $r_4$ becomes either larger than the upper limit or smaller than the lower limit of the condition (3), the angle of incidence onto the image guide becomes large and this is not desirable.

Moreover, when a material having a high refractive index like the lens $L_2$ is used also for the lens $L_3$, it is possible to make Petzval's sum small. Therefore, it is preferable to select the refractive index $n_3$ of the lens $L_3$ so that it satisfies the condition (4) shown below.

$$n_3 \geq 1.75 \quad (4)$$

When $n_3$ becomes smaller than the lower limit of the condition (4), Petzval's sum becomes large and this is not desirable.

Objectives for endoscopes have very short focal lengths and, in case of an objective which does not comprise a field lens unlike the present invention, the rear surface (surface on the image side) of the objective comes very close to the entrance surface of the image guide. Therefore, scratch marks, stains, etc. on the lens surface are observed together with the image of the object. To prevent such inconvenience, the airspace between the rear surface of the objective and entrance surface of the image guide is made large utilizing the fact that the depth of focus of the objective is large (as objectives for endoscopes have short focal lengths as described in the above, their depths of focus are large) so that the abovementioned scratch marks, stains, etc. become inconspicuous. However, in case of an objective comprising a field lens like the objective according to the present invention, the field lens $L_3$ is arranged between the lens $L_2$ and image guide G and, therefore, it is not possible to make the airspace between the field lens $L_3$ and image guide G satisfactorily large. Consequently, scratch marks, stains, etc. on the rear surface of the lens $L_3$ becomes conspicuous and disturbe the observation. In the present invention, the lens $L_3$ and image guide G are cemented together so that stains etc. do not stick to the lens surface. Besides, scratch marks become very inconspicuous because they are filled up with the cementing agent (having a refractive index close to the refractive index of glass).

DETAILED DESCRIPTION OF THE PREFERRED EMBODIMENTS

Figure 1:
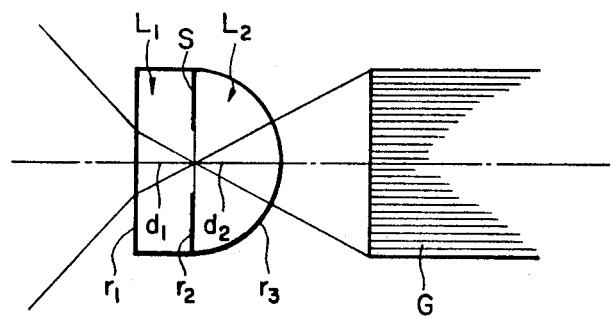
FIG. 1 shows a sectional view of a known objective optical system for endoscopes.
Figure 2:
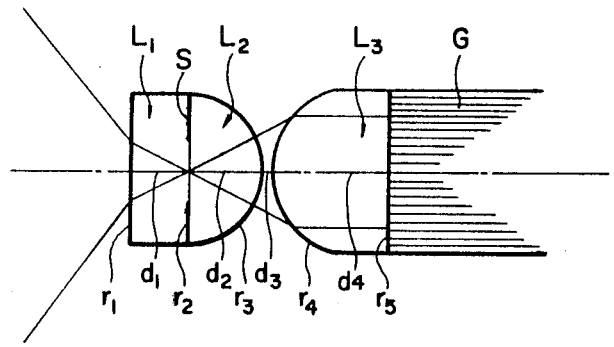
FIG. 2 shows a sectional view of the objective optical system for endoscopes according to the present invention.
Figure 3:
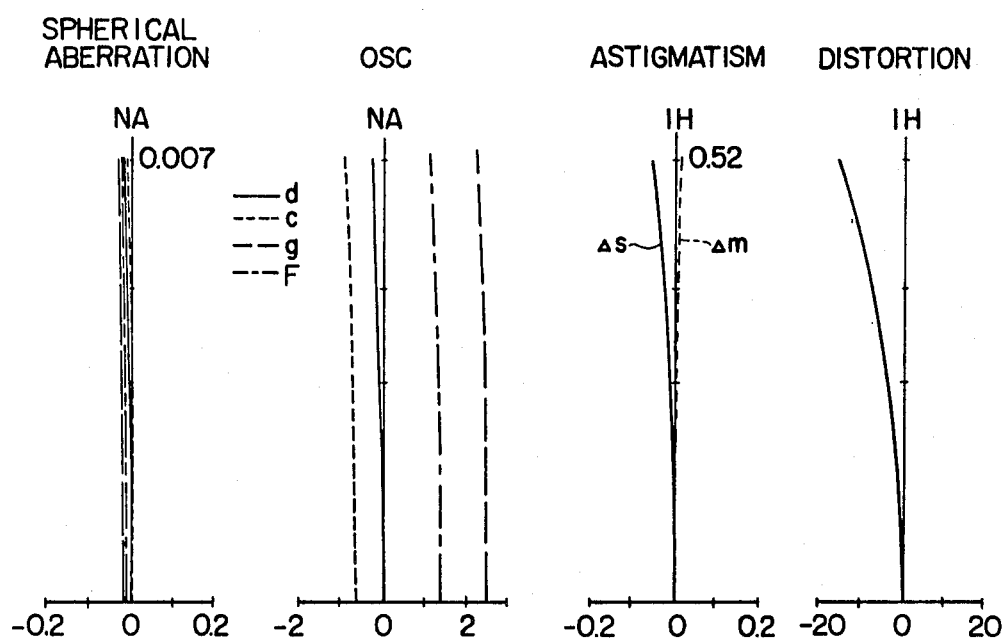
FIGS. 3 through 8 respectively show graphs illustrating aberration curves of Embodiments 1 through 6 of the present invention.
Figure 4:
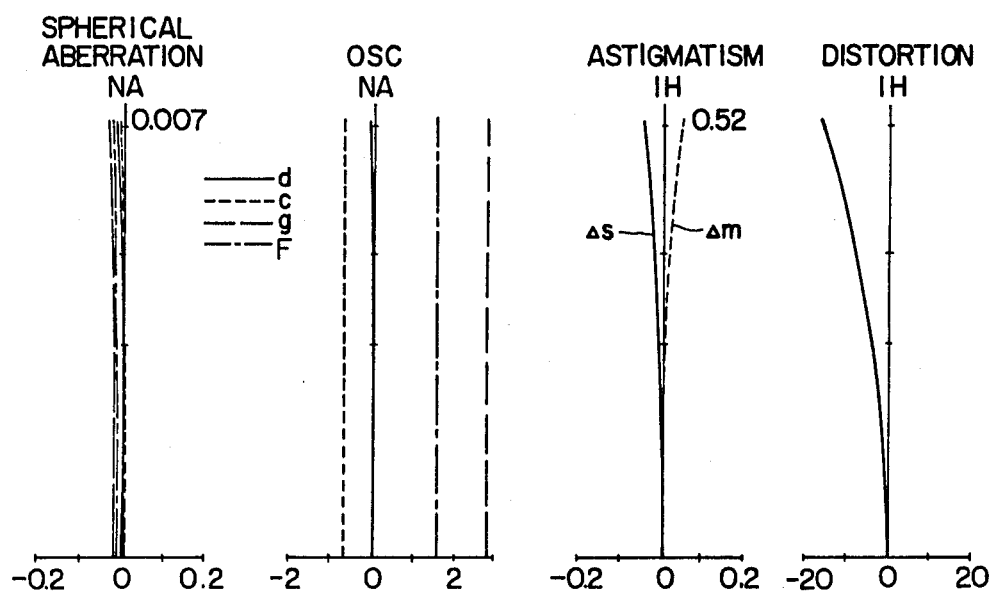
Figure 5:
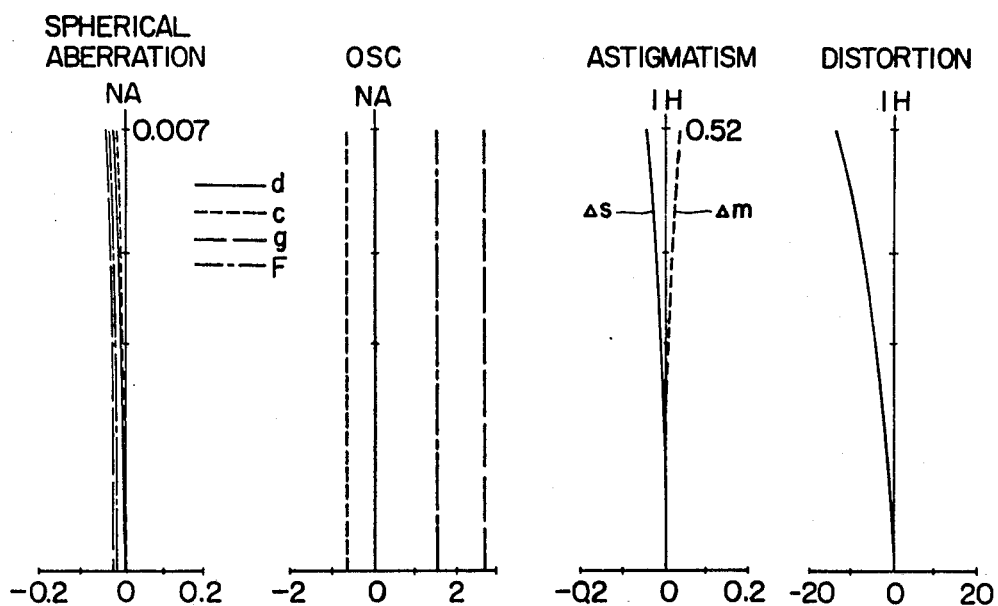
Figure 6:
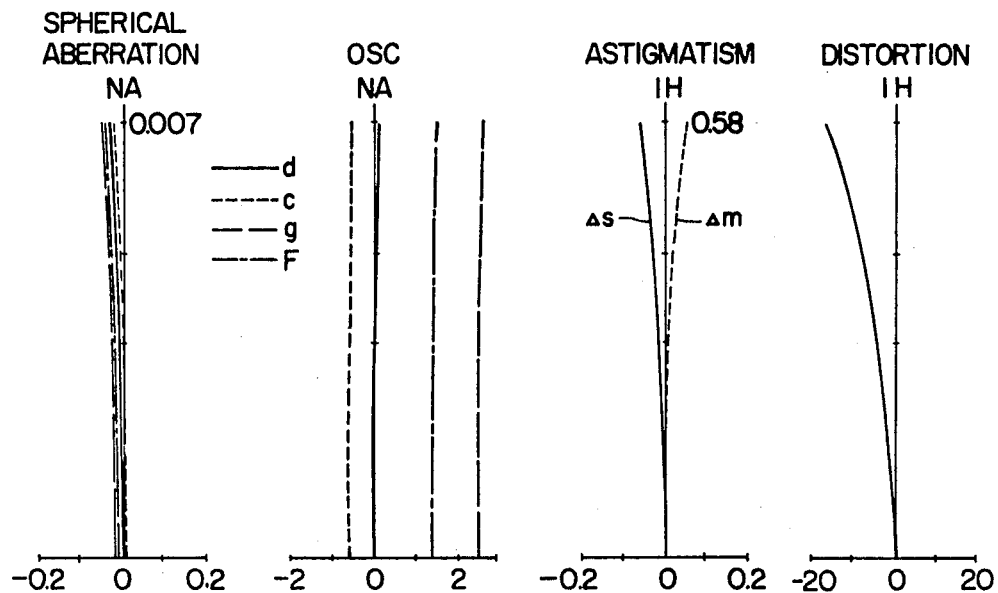
Figure 7:
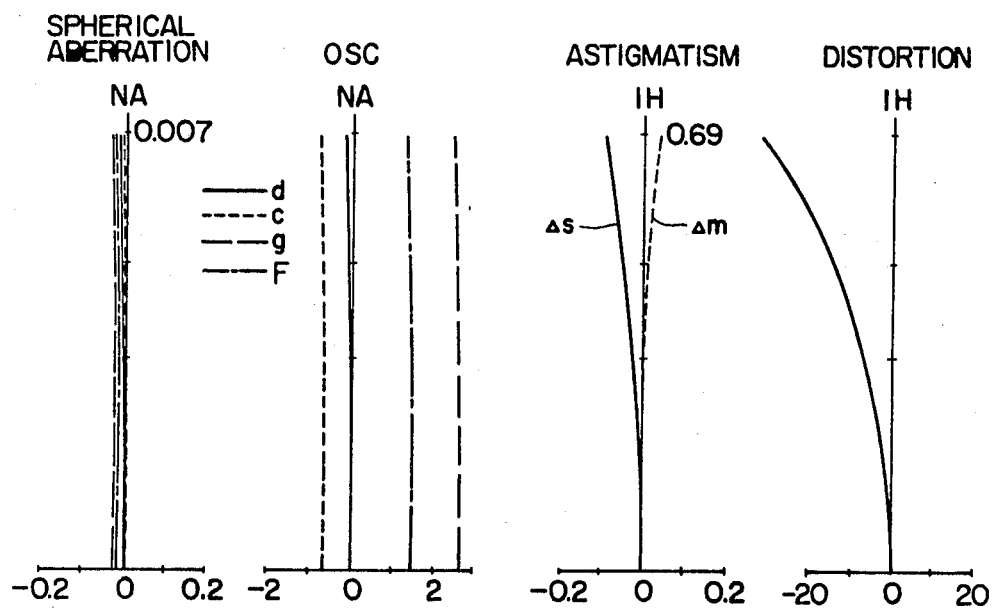
Figure 8:
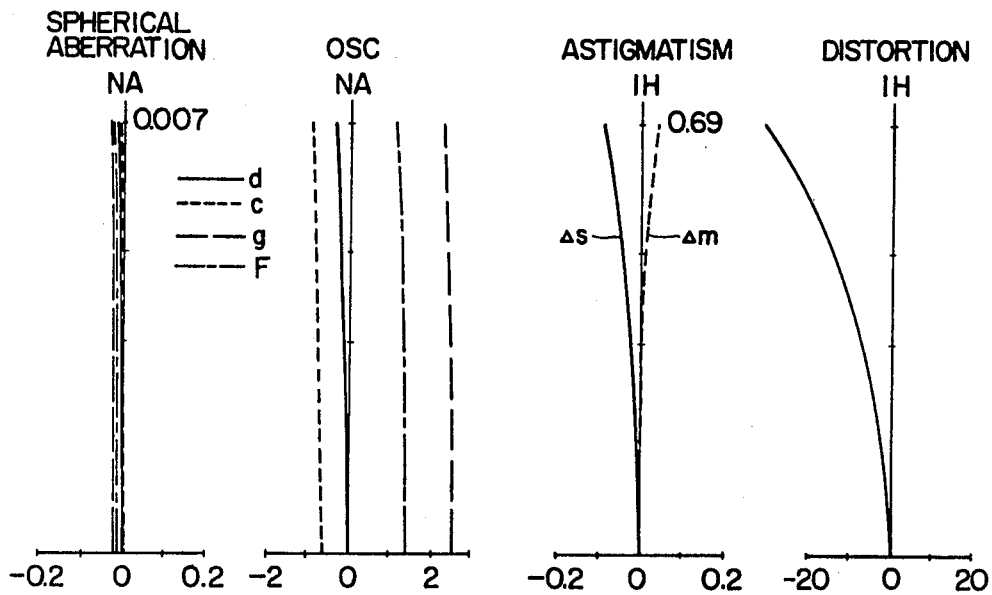

Now, the preferred embodiments of the objective optical system for endoscopes according to the present invention explained in the above are shown below.

Embodiment 1:
$r_1 = \infty$
$d_1 = 0.5$  $n_1 = 1.83481$  $\nu_1 = 42.7$
$r_2 = \infty$
$d_2 = n_2 = 1.8061$  $\nu_2 = 40.9$
$r_3 = -1.5354$
$d_3 = 0.18$
$r_4 = 1.5354$
$d_4 = 1.69$  $n_3 = 1.8061$  $\nu_3 = 40.9$
$r_5 = \infty$
$f = 1$,  distance to object $= -30$
$2\omega = 63°21'$ Embodiment 2:
$r_1 = \infty$
$d_1 = 0.5$  $n_1 = 1.83481$  $\nu_1 = 42.7$
$r_2 = \infty$
$d_2 = 1.535$  $n_2 = 1.80610$  $\nu_2 = 40.9$
$r_3 = -1.5354$
$d_3 = 0.354$
$r_4 = 1.382$
$d_4 = 1.53$  $n_3$ 1.80610  $\nu_3 = 40.9$
$r_5 = \infty$
$f = 1$,  distance to object $= -30$
$2\omega = 63°4'$ Embodiment 3:
$r_1 = \infty$
$d_1 = 0.5$  $n_1 = 1.83481$  $\nu_1 = 42.7$
$r_2 = \infty$
$d_2 = 1.535$  $n_2 = 1.8061$  $\nu_2 = 40.9$
$r_3 = -1.5354$
$d_3 = 0.354$
$r_4 = 1.5354$
$d_4 = 1.61$  $n_3 = 1.8061$  $\nu_3 = 40.9$
$r_5 = \infty$
$f = 1$,  distance to object $= -30$
$2\omega = 59°40'$ Embodiment 4:
$r_1 = \infty$
$d_1 = 0.5$  $n_1 = 1.51633$  $\nu_1 = 64.1$
$r_2 = \infty$
$d_2 = 1.33$  $n_2 = 1.8061$  $\nu_2 = 40.9$
$r_3 = -1.5435$
$d_3 = 0.16$
$r_4 = 1.5435$
$d_4 = 1.714$  $n_3 = 1.8061$  $\nu_3 = 40.9$
$r_5 = \infty$
$f = 1$,  distance to object $= -30$
$2\omega = 90°36'$ Embodiment 5:
$r_1 = \infty$
$d_1 = 0.57$  $n_1 = 1.51633$  $\nu_1 = 64.1$
$r_2 = \infty$
$d_2 = 1.316$  $n_2 = 1.8061$  $\nu_2 = 40.9$
$r_3 = -1.2976$
$d_3 = 0.315$
$r_4 = 1.711$
$d_4 = 1.512$  $n_3 = 1.8061$  $\nu_3 = 40.9$
$r_5 = \infty$
$f = 1$,  distance to object $= -30$
$2\omega = 69°34'$ Embodiment 6:
$r_1 = \infty$
$d_1 = 0.5$  $n_1 = 1.51633$  $\nu_1 = 64.1$
$r_2 = \infty$
$d_2 = 1.33$  $n_2 = 1.883$  $\nu_2 = 40.8$
$r_3 = -1.691$
$d_3 = 0.18$
$r_4 = 1.68$
$d_4 = 1.768$  $n_3 = 1.883$  $\nu_3 = 40.8$
$r_5 = \infty$
$f = 1$,  distance to object $= -30$
$2\omega = 89°14'$ In the above embodiments, reference symbols $r_1$ through $r_5$ respectively represent radii of curvature of respective lens surfaces, reference symbols $d_1$ through $d_4$ respectively represent thicknesses of respective lenses and airspace between respective lenses, reference symbols $n_1$, $n_2$ and $n_3$ respectively represent refractive indices of respective lenses, reference symbols $\nu_1$, $\nu_2$ and $\nu_3$ respectively represent Abbe's numbers of respective lenses, and reference symbol f represents the focal length of the objective.

In each of the above-mentioned embodiments, the relation between the field angle $2\omega$ and angle of incidence $\theta$ of principal ray onto the fiber bundle is as shown below.

Embodiment 1:
| | | | | |
|---|---|---|---|---|
| $2\omega$ | 63°21' | 42°42' | 30°2' | 17°11' |
| $\theta$ | 2°43' | 3°14' | 2°40' | 1°48' |

Embodiment 2
| | | | | |
|---|---|---|---|---|
| $2\omega$ | 63°4' | 43°2' | 30°17' | 17°59' |
| $\theta$ | 7°47' | 2°51' | 1°24' | 37' |

-continued

| | | | | |
|---|---|---|---|---|
| Embodiment 3: | | | | |
| $2\omega$ | 59°40' | 40°39' | 28°42' | 17°5' |
| $\theta$ | 3°41' | 1°2' | 19' | 2' |
| Embodiment 4: | | | | |
| $2\omega$ | 90°36' | 58°15' | 40°23' | 23°49' |
| $\theta$ | 3°36' | 2°27' | 2°44' | 1°57' |
| Embodiment 5: | | | | |
| $2\omega$ | 69°34' | 47°25' | 33°29' | 19°56' |
| $\theta$ | 24' | 1°44' | 1°39' | 1°13' |
| Embodiment 6: | | | | |
| $2\omega$ | 89°14' | 57°54' | 40°13' | 23°44' |
| $\theta$ | 0°56' | 3°16' | 3°12' | 2°12' |

Besides, for the known objective used in the objective optical system for endoscopes shown in FIG. 1, an example of numerical data thereof and the relation between the field angle $2\omega$ thereof and angle of incidence $\theta$ of principal ray onto the image guide are shown below.

| | | | | |
|---|---|---|---|---|
| $r_1 = \infty$ | | | | |
| $d_1 = 0.8$ | | $n_1 = 1.883$ | | |
| $r_2 = \infty$ | | | | |
| $d_2 = 0.883$ | | $n_2 = 1.883$ | | |
| $r_3 = -0.883$ | | | | |
| $f = 1$, | | distance to object $= -30$ | | |
| $2\omega$ | 40°41' | 28°25' | 20°16' | 12°9' |
| $\theta$ | 10°38' | 7°29' | 5°21' | 3°13' |

As it is evident from the explanation hitherto, the objective optical system according to the present invention has a larger field angle compared with the known objective optical system and, moreover, the angle of incidence of principal ray at a large field angle onto the image guide is extremely small.

I claim:

1. An objective optical system for endoscopes comprising an objective and an image-transmitting optical fiber bundle for transmitting an image of an object formed by said objective, said objective comprising a first lens component consisting of a cover glass and plano-convex lens cemented together by arranging a stop between them and a second lens component consisting of a plano-convex lens arranged convex toward the objective side, said objective optical system for endoscopes satisfying the following conditions:

$$0.7|r_3| \leq d_2 \leq 1.1|r_3| \quad (1)$$

$$n_2 \geq 1.75 \quad (2)$$

$$0.6 \times (n_3-1)(d_2+d_3) \leq r_4 \leq 1.4 \times (n_3-1)(d_2+d_3) \quad (3)$$

$$n_3 \geq 1.75 \quad (4)$$

wherein the reference symbol $r_3$ represents the radius of curvature of the surface on the image side of the first lens component, reference symbol $r_4$ represents the radius of curvature of the surface on the object side of the second lens component, reference symbol $d_2$ represents the thickness of the plano-convex lens constituting the first lens component, reference symbol $d_3$ represents the airspace between the first and second lens components, reference symbol $n_2$ represents the refractive index of the plano-convex lens constituting the first lens component, and reference symbol $n_3$ represents the refractive index of the second lens component.

2. An objective optical system for endoscopes according to claim 1, in which the surface on the image side of said second lens component is cemented to the end face of said image-transmitting optical fiber bundle.

3. An objective optical system for endoscopes according to claim 1, in which said objective has the following data:

| | | |
|---|---|---|
| $r_1 = \infty$ | | |
| $d_1 = 0.5$ | $n_1 = 1.83481$ | $\nu_1 = 42.7$ |
| $r_2 = \infty$ | | |
| $d_2 = 1.27$ | $n_2 = 1.8061$ | $\nu_2 = 40.9$ |
| $r_3 = -1.5354$ | | |
| $d_3 = 0.18$ | | |
| $r_4 = 1.5354$ | | |
| $d_4 = 1.69$ | $n_3 = 1.8061$ | $\nu_3 = 40.9$ |
| $r_5 = \infty$ | | |
| $f = 1$, | distance to object $= -30$ | |
| $2\omega = 63°21'$ | | | wherein reference symbols $r_1$ through $r_5$ respectively represent radii of curvature of respective lens surfaces in the objective, reference symbols $d_1$, $d_2$, $d_3$ and $d_4$ respectively represent thicknesses of respective lenses constituting the objective and airspace between respective lenses, reference symbols $n_1$, $n_2$ and $n_3$ respectively represent refractive indices of respective lenses constituting the objective, reference symbols $\nu_1$, $\nu_2$ and $\nu_3$ respectively represent Abbe's numbers of respective lenses constituting the objective, and reference symbol f represents the total focal length of the objective.

4. An objective optical system for endoscopes according to claim 1, in which said objective has the following numerical data:

| | | |
|---|---|---|
| $r_1 = \infty$ | | |
| $d_1 = 0.5$ | $n_1 = 1.83481$ | $\nu_1 = 42.7$ |
| $r_2 = \infty$ | | |
| $d_2 = 1.535$ | $n_2 = 1.80610$ | $\nu_2 = 40.9$ |
| $r_3 = -1.5354$ | | |
| $d_3 = 0.354$ | | |
| $r_4 = 1.382$ | | |
| $d_4 = 1.53$ | $n_3 = 1.80610$ | $\nu_3 = 40.9$ |
| $r_5 = \infty$ | | |
| $f = 1$, | distance to object $= -30$ | |
| $2\omega = 63°4'$ | | | wherein reference symbols $r_1$ through $r_5$ respectively represent radii of curvature of respective lens surfaces in the objective, reference symbols $d_1$, $d_2$, $d_3$ and $d_4$ respectively represent thicknesses of respective lenses constituting the objective and airspace between respective lenses, reference symbols $n_1$, $n_2$ and $n_3$ respectively represent refractive indices of respective lenses constituting the objective, reference symbols $\nu_1$, $\nu_2$ and $\nu_3$ respectively represent Abbe's numbers of respective lenses constituting the objective, and reference symbol f represents the total focal length of the objective.

5. An objective optical system for endoscopes according to claim 1, in which said objective has the following numeral data:

| | | |
|---|---|---|
| $r_1 = \infty$ | | |
| $d_1 = 0.5$ | $n_1 = 1.83481$ | $\nu_1 = 42.7$ |
| $r_2 = \infty$ | | |
| $d_2 = 1.535$ | $n_2 = 1.8061$ | $\nu_2 = 40.9$ |
| $r_3 = -1.5354$ | | |
| $d_3 = 0.354$ | | |
| $r_4 = 1.5354$ | | |
| $d_4 = 1.61$ | $n_3 = 1.8061$ | $\nu_3 = 40.9$ |
| $r_5 = \infty$ | | |
| $f = 1$, | distance to object $= -30$ | |

$2\omega = 59°40'$ wherein reference symbols $r_1$ through $r_5$ respectively represent radii of curvature of respective lens surfaces in the objective, reference symbols $d_1$, $d_2$, $d_3$ and $d_4$ respectively represent thicknesses of respective lenses constituting the objective and airspace between respective lenses, reference symbols $n_1$, $n_2$ and $n_3$ respectively represent refractive indices of respective lenses constituting the objective, reference symbols $\nu_1$, $\nu_2$ and $\nu_3$ respectively represent Abbe's numbers of respective lenses constituting the objective, and reference symbol f represents the total focal length of the objective.

6. An objective optical system for endoscopes according to claim 1, in which said objective has the following numerical data:

$r_1 =$
$d_1 = 0.5$    $n_1 = 1.51633$    $\nu_1 = 64.1$
$r_2 = \infty$
$d_2 = 1.33$    $n_2 = 1.8061$    $\nu_2 = 40.9$
$r_3 = -1.5435$
$d_3 = 0.16$
$r_4 = 1.5435$
$d_4 = 1.714$    $n_3 = 1.8061$    $\nu_3 = 40.9$
$r_5 = \infty$
$f = 1$,    distance to object $= -30$
$2\omega = 90°36'$ wherein reference symbols $r_1$ through $r_5$ respectively represent radii of curvature of respective lens surfaces in the objective, reference symbols $d_1$, $d_2$, $d_3$ and $d_4$ respectively represent thicknesses of respective lenses constituting the objective and airspace between respective lenses, reference symbols $n_1$, $n_2$ and $n_3$ respectively represent refractive indices of respective lenses constituting the objective, reference symbols $\nu_1$, $\nu_2$ and $\nu_3$ respectively represent Abbe's numbers of respective lenses constituting the objective, and reference symbol f represents the total focal length of the objective.

7. An objective optical system for endoscopes according to claim 1, in which said objective has the following numerical data:

$r_1 = \infty$
$d_1 = 0.57$    $n_1 = 1.51633$    $\nu_1 = 64.1$
$r_2 = \infty$
$d_2 = 1.316$    $n_2 = 1.8061$    $\nu_2 = 40.9$
$r_3 = -1.2976$
$d_3 = 0.315$
$r_4 = 1.711$
$d_4 = 1.512$    $n_3 = 1.8061$    $\nu_3 = 40.9$
$r_5 = \infty$
$f = 1$,    distance to object $= -30$
$2\omega = 69°34'$ wherein reference symbols $r_1$ through $r_5$ respectively represent radii of curvature of respective lens surfaces in the objective, reference symbols $d_1$, $d_2$, $d_3$ and $d_4$ respectively represent thicknesses of respective lenses constituting the objective and airspace between respective lenses, reference symbols $n_1$, $n_2$ and $n_3$ respectively represent refractive indices of respective lenses constituting the objective, reference symbols $\nu_1$, $\nu_2$ and $\nu_3$ respectively represent Abbe's numbers of respective lenses constituting the objective, and reference symbol f represents the total focal length of the objective.

8. An objective optical system for endoscopes according to claim 1, in which said objective has the following numerical data:

$r_1 = \infty$
$d_1 = 0.5$    $n_1 = 1.51633$    $\nu_1 = 64.1$
$r_2 = \infty$
$d_2 = 1.33$    $n_2 = 1.883$    $\nu_2 = 40.8$
$r_3 = -1.691$
$d_3 = 0.18$
$r_4 = 1.68$
$d_4 = 1.768$    $n_3 = 1.883$    $\nu_3 = 40.8$
$r_5 = \infty$
$f = 1$,    distance to object $= -30$
$2\omega = 89°14'$ wherein reference symbols $r_1$ through $r_5$ respectively represent radii of curvature of respective lens surfaces in the objective, reference symbols $d_1$, $d_2$, $d_3$ and $d_4$ respectively represent thicknesses of respective lenses constituting the objective and airspace between respective lenses, reference symbols $n_1$, $n_2$ and $n_3$ respectively represent refractive indices of respective lenses constituting the objective, reference symbols $\nu_1$, $\nu_2$ and $\nu_3$ respectively represent Abbe's numbers of respective lenses constituting the objective, and reference symbol f represents the total focal length of the objective.

* * * * *